United States Patent [19]

Vasa

[11] Patent Number: 4,666,170

[45] Date of Patent: May 19, 1987

[54] ALL TERRAIN WHEELCHAIR

[75] Inventor: Jiri Vasa, Kingston, Canada

[73] Assignee: Queen's University at Kingston, Kingston, Canada

[21] Appl. No.: 857,525

[22] Filed: Apr. 23, 1986

Related U.S. Application Data

[63] Continuation of Ser. No. 718,497, Apr. 1, 1985, abandoned.

[51] Int. Cl.[4] .................. B62B 1/00

[52] U.S. Cl. .................. 280/47.19; 280/291

[58] Field of Search .................. 280/652, 653, 654, 47.17, 280/47.19, 47.2, 291; 297/DIG. 4

[56] References Cited

U.S. PATENT DOCUMENTS

| | | | |
|---|---|---|---|
| 120,478 | 10/1871 | Asbile | 280/47.17 X |
| 630,689 | 8/1899 | Gries | 280/47.17 X |
| 983,200 | 1/1911 | Boszol | 280/47.17 |
| 1,245,004 | 10/1917 | Mayfield | 280/47.17 X |
| 2,855,061 | 10/1958 | Lilienthal et al. | 280/47.17 X |
| 2,973,203 | 2/1961 | Taylor | 280/47.2 X |
| 4,030,768 | 6/1977 | Lugash | 280/47.19 X |

*Primary Examiner*—John J. Love
*Assistant Examiner*—Michael Mar
*Attorney, Agent, or Firm*—Richard J. Hicks

[57] ABSTRACT

A wheelchair includes a seat mounted on a frame supported on two wheels only. The wheels are mounted one in front of the other so that in use a first of the wheels tends to follow in the track of the second wheel. Handle means are provided by which an attendant can propel the wheelchair and maintain it upright. The size of the wheels and the location of the seat lengthwise between the two wheels ensures a low center of gravity and easy management by the attendant. Preferably the foremost of the two wheels acts as a castor wheel.

4 Claims, 4 Drawing Figures

ALL TERRAIN WHEELCHAIR

This application is a continuation-in-part of application Ser. No. 718,497, filed Apr. 1, 1985 now abandoned.

FIELD OF INVENTION

This invention relates to wheelchairs used for the transportation of physically and/or mentally disadvantaged individuals. Typical existing wheelchairs for this purpose have two large wheels at the rear, and one or two smaller wheels at the front. Such wheelchairs have their seats in a position above the level of the wheel axes of the rear large wheels, so that the passenger in the wheelchair can assume a normal sitting posture. Some such wheelchairs are propelled and guided by the individual in the wheelchair, by use of their hands on smaller handwheels secured to the outer sides of the two large wheels. Some have propelling motors, which may be operated by the individual riding in the wheelchair. Most include a transverse handbar at the rear by which an attendant can propel and guide the wheelchair. This distance between handgrip positions on such a handbar is necessarily less than the transverse wheelbase of the two large rear wheels.

The transverse wheelbase of typical wheelchairs is a compromise between the desire for a large wheelbase, to provide lateral stability, and the desire for a small wheelbase, to permit passageway through normal doorways. The wheelbase generally adopted is too wide for it to possible to guide the wheelchair between obstacles such as rocks and tree stumps in an outdoor environment. If, however, the wheelbase adopted is too narrow it will not provide lateral stability on an uneven surface, and when traversing across a slope.

OBJECT OF INVENTION

An object of the present invention is the provision of a wheelchair which can be used to transport a physically and/or mentally disadvantaged individual over terrain which cannot be traversed by existing wheelchairs.

BRIEF DESCRIPTION OF INVENTION

According to the present invention, a wheelchair suitable for the transportation of a physically and/or mentally disadvantaged individual comprises an elongated frame having a forward end and a rearward end, a first ground-engaging wheel disposed in use below the frame and arranged to rotate about a first axis which extends transversely of the frame, a second ground-engaging wheel also disposed in use below the frame towards the forward end of the frame from the first wheel and so mounted that when the wheelchair is in normal upright operating position the first wheel will follow in the track of the second wheel, support means mounted on the frame lengthwise between the first and second wheels, and at a level close to that of the upper parts of those wheels, these support means being shaped to support an individual in the wheelchair, and first and second handle elements mounted on the rear end of the frame and disposed at such a height relative to the wheels that they may be comfortably grasped by an attendant walking behind the wheelchair, and spaced apart transversely of the wheelchair by such a distance that said attendant can readily retrain the wheelchair when it is tipped sidewardly from the upright position despite the weight of the individual in the wheelchair and the fact that the wheelchair is supported only on the two wheels.

DESCRIPTION OF DRAWINGS

The invention will now described, by way of example, with reference to the accompanying diagrammatic drawings in which.

DETAILED DESCRIPTION OF PREFERRED EMBODIMENTS

Figure 1:
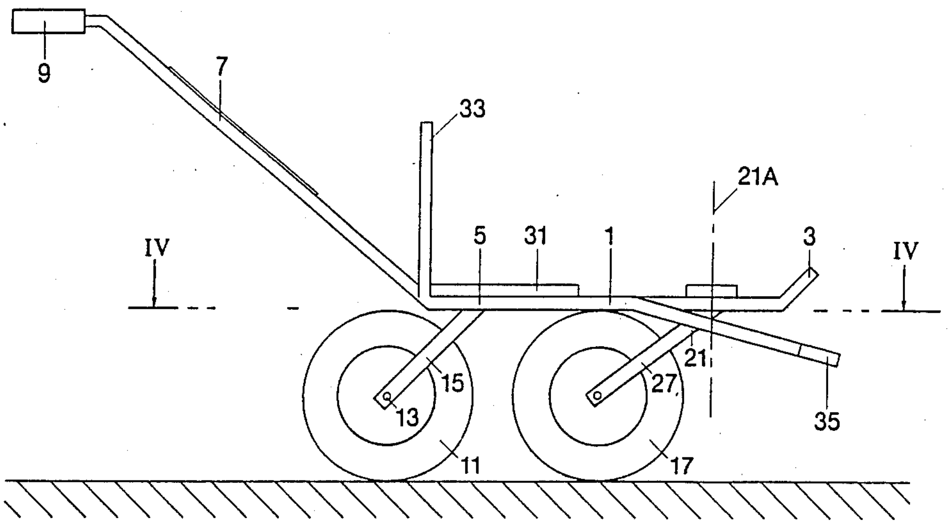
FIG. 1 is a side elevation of a wheelchair.
Figure 2:
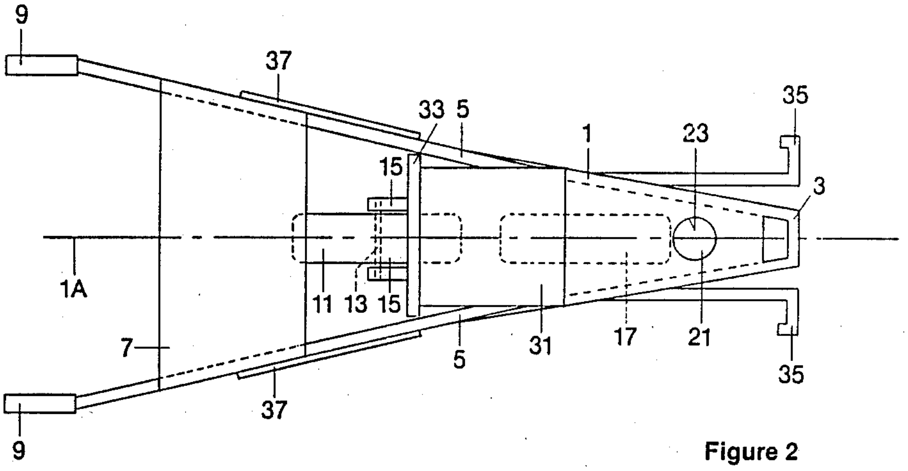
FIG. 2 is a plan view of the wheelchair shown in FIG. 1.
Figure 3:
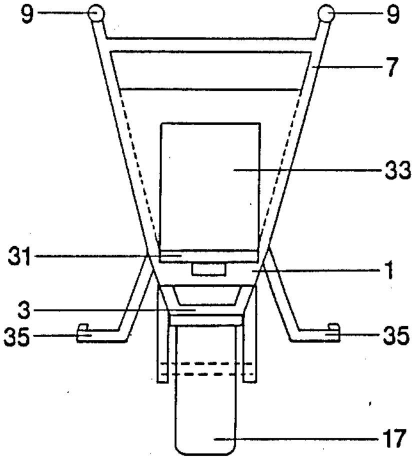
FIG. 3 is a frontal view of the wheelchair shown in FIGS. 1 and 2.
Figure 4:
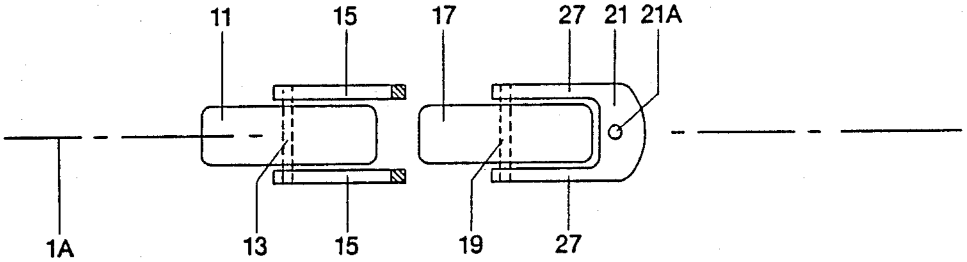
FIG. 4 is a sectional plan view taken on the line IV—IV of FIG. 1.

A wheelchair of the present invention includes a frame 1 constructed for the most part of square-section aluminum or other suitable and conventional metal tubing with suitable gusset plates of sheet aluminum. At its forward end this frame may be shaped to provide a towing and/or lifting loop 3, from which two side members 5 extend rearwardly and then upwardly to form a rearward end 7 to the frame. At its rearward end 7 the frame is provided with two handle elements 9. At about the mid-length of the frame 1, a first around engaging wheel 11 is mounted on an axle 13 which extends transversely of frame 1 and is disposed below the frame side member 5. This axle at its two ends is carried by two struts 15 which extend downwardly and rearwardly from the side members 5. It will be seen that this wheel 11 lies directly under the longitudinal centre line 1A of the frame 1. A second ground engaging wheel 17 has an axle 19 which is preferably mounted on a castor assembly 21. Assembly 21 is itself mounted rotatably about a vertical axis 21A on the frame 1 by a bearing 23. The axle 19 is carried by two parallel arms 27 of the castor assembly. Since the axis 21A passes through the longitudinal centre line 1A of the frame 1, wheel 17 can be swung sidewardly in each direction from the central position shown in FIG. 4. When wheel 17 is in that central position, forward movement of the wheelchair will cause the first wheel 11 to follow in the track of the second wheel 17.

Also mounted on the frame 1 is support means in the form of a seat 31 shaped to support an individual in the wheelchair. Associated with seat 31 is an upright seat back 33. It will be noted that the seat 31 is mounted on the frame lengthwise between the first and second wheels, and at a level close to that of the upper parts of the two wheels. Because of this, the centre of gravity of an individual riding in the wheelchair will be positioned vertically above the centre line of the wheelchair, forwardly of the axle 13 of the first wheel 11, and will be lower than the handle elements 9. At the forward end of frame 1 two foot supports 35 are provided. Further, the two side members 5 carry two prop stands 37, one on each side of the wheelchair. These prop stands normally occupy the raised positions shown in the drawings, but can be swing downwardly to locked positions in which their lower ends both engage the ground to maintain the wheelchair upright. A suitable shoulder-and-lap belt can be provided, if considered advisable, to support or restrain the individual in the wheelchair.

The dimensions of the wheelchair must be selected to suit the size of the person it is to carry, and also the probable size of any attendant. It will be appreciated that different ethnic groups have different statures. For example, in the case of a wheelchair intended for use in North America for the conveyance of an adult disabled person, the handle elements suitably could be positioned at a height of 36 inches, and they could be spaced apart transversely of the frame by a distance of 28 inches. In any case, height of the handle elements is expected to fall in the range 30 to 42 inches, and the transverse spacing of the handle elements is expected to fall in the range 20 to 40 inches.

As regards the wheels 11 and 17, these have pneumatic tyres suitable for use at walking speeds at inflation pressures such that the tyres act as effective cushioning means for the individual in the wheelchair. Further, these tyres are of such a width in cross section that the wheels will not readily sink when traversing soft earth or sand. Suitable tyres are readily available in a variety of sizes commercially classified according to overall diameter and width in inches. Typical sizes are 13.0×5., 15×6. and 16×6.50. In practice, a wheel diameter (overall) of between 10 and 16 inches is found to provide a convenient construction for the wheelchair.

In use of the wheelchair shown and described, a disabled individual is assisted in mounting the wheelchair by a first attendant while a second attendant maintains the frame against sideward tilting, by firmly restraining the two handle elements 9. Once the individual is comfortably seated on seat 31 and supported by seat back 33 and foot supports 35, the safety belt (if provided) can be secured.

An attendant can then propel the wheelchair somewhat in the manner in which one propels a normal wheelbarrow. However, by the provision of two longitudinally spaced wheels with weight of the passenger acting between them, the attendant has no need to carry the weight of the passenger. Because of the low position of the centre of gravity f the passenger and the arrangement of the handle elememts, the attendant may readily restrain the wheelchair against any tendency to tip sidewardly. Furthermore, when it is desired to negotiate a bend in a road or trail, a slight inclination or tilting of the frame to one side from its normal upright position will cause the front wheel 17 to swing to one side in such a manner that the front end of the frame tends to turn, on continued forward movement of the wheelchair, in the direction in which the wheelchair is tilted.

The wheelchair of the present invention can readily be propelled along narrow, winding trails; it can readily negotiate soft earth, sand and small pebbles; while the forward loop 3 can be used to lift the forward end over larger obstacles and for the ready attachment of a tow rope when a steep slope must be climbed. Traversal of a moderate slope is facilitated by the ease with which the wheelchair may be maintained upright.

I claim:

1. A wheelchair suitable for the transportation of a physically and/or mentally disadvantaged individual over uneven ground comprising an elongated frame having a forward end and rearward end, a first ground-engaging wheel disposed in use below the frame and arranged to rotate about a first transverse axis, a pair of struts having upper ends secured proximate to the rear of the elongated frame, the pair of struts extending downwardly and rearwardly therefrom and having lower ends through which the first axis extends, a second ground-engaging wheel mounted for rotation about a second transverse axis, a pivoting assembly secured proximate the front of the elongated frame for pivotal movement about a vertical axis, the pivoting assembly having a pair of arms extending downwardly and rearwardly therefrom and having lower ends through which the second axis extends, such that when the wheelchair is in a normal upright operating position the first wheel will follow in the track of the second wheel and upon tilting of the frame from the upright position, the front end of the frame will tend to turn, on continued forward movement of the wheelchair, in the direction in which the wheelchair is tilted, each of said wheels being provided with a pneumatic tire effective to provide cushioning means for an individual in the wheelchair, support means mounted on the frame lengthwise between the first and second wheels and at a level close to that of the upper parts of said wheels, said support means being shaped to support an individual in the wheelchair between said first and second wheels such that the centre of gravity of an individual in the wheelchair is positioned forwardly of the transverse axis of the first wheel, a pair of foot supports extending downwardly and forwardly from the elongated frame, and first and second handle elements mounted on the rear end of the frame and disposed at such a height relative to the wheels that they may be comfortably grasped by an attendant walking behind the wheelchair, and spaced apart transversely of the wheelchair by such a distance that said attendant can readily restrain the wheelchair when it is tipped sidewardly from the upright position despite the weight of the individual in the wheelchair and the fact that the wheelchair is supported only on the two wheels.

2. A wheelchair as claimed in claim 1, wherein each wheel has a diameter falling within the range of 10 to 16 inches.

3. A wheelchair as claimed in claim 1, wherein the height of the handle elements relative to the bottoms the wheels falls within the range of 30 to 42 inches.

4. A wheelchair as claimed in claim 1, wherein the handle elements are spaced apart transversely of the wheelchair by a distance falling in the range of 20 to 40 inches.

* * * * *